Feb. 6, 1951  T. T. REMBUSCH ET AL  2,540,911
COUNTING AND RECORDING APPARATUS
Filed Aug. 30, 1944  5 Sheets-Sheet 1

Inventor
Trueman T. Rembusch,
Harris P. Wolfberg,
By
Attorney

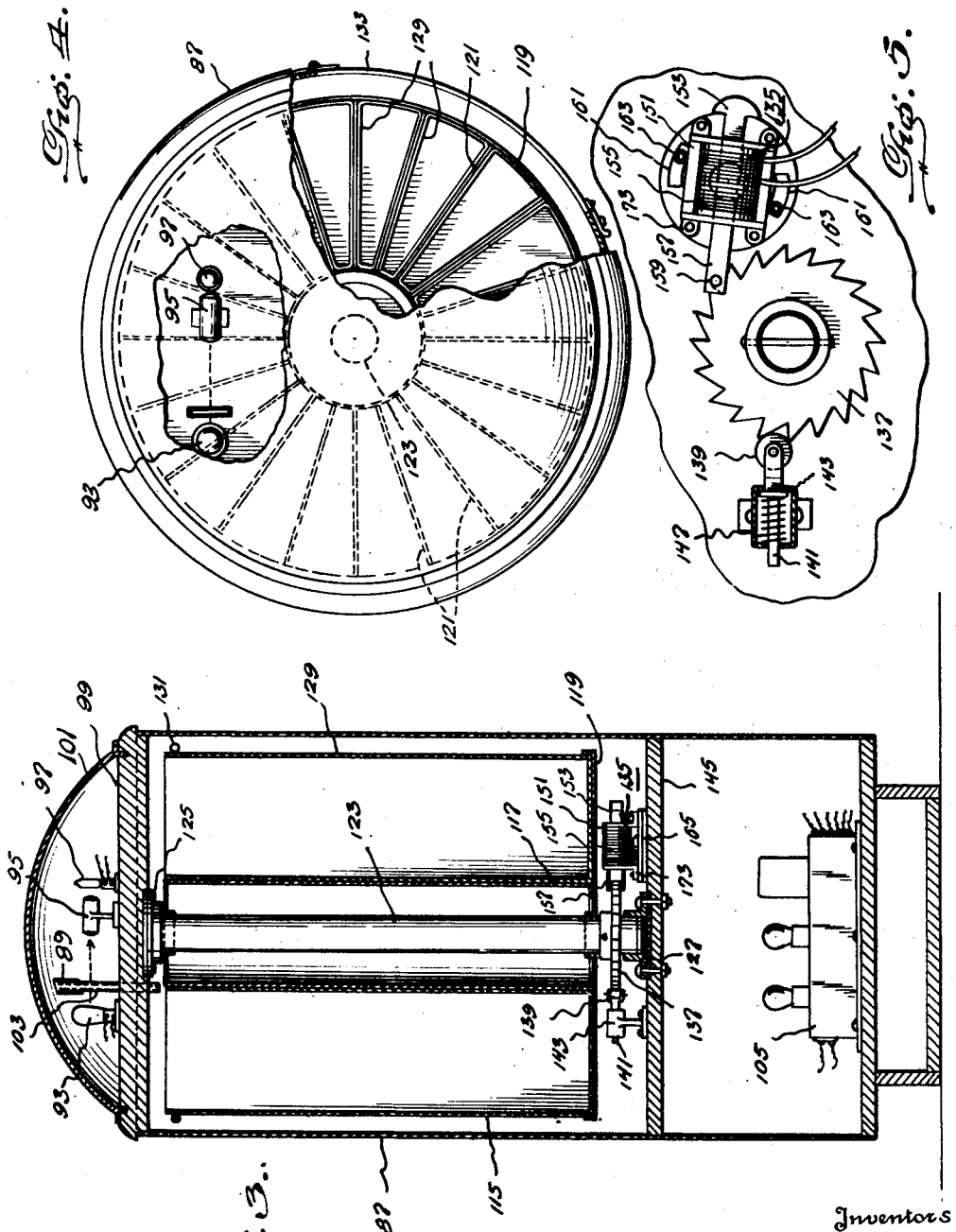

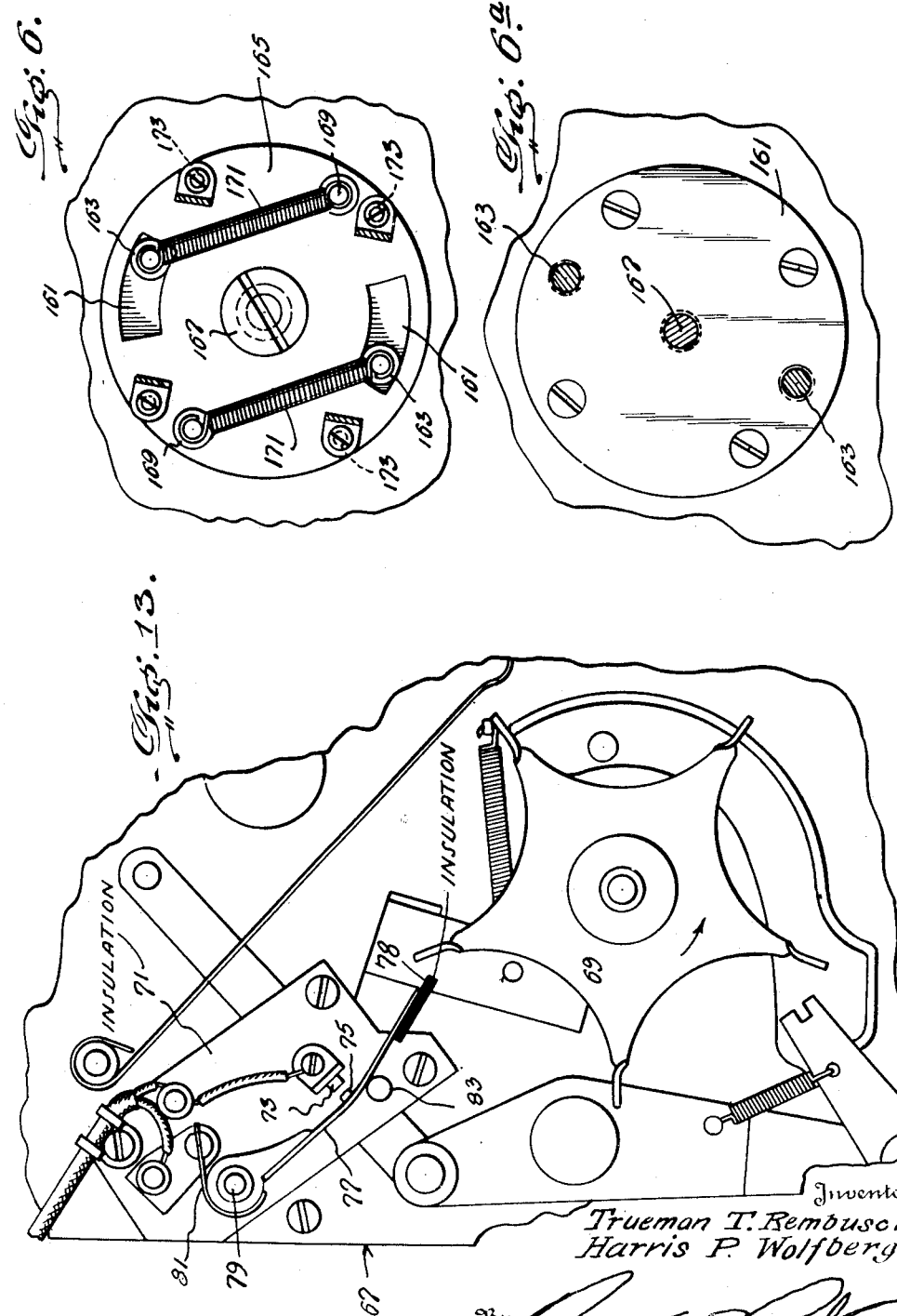

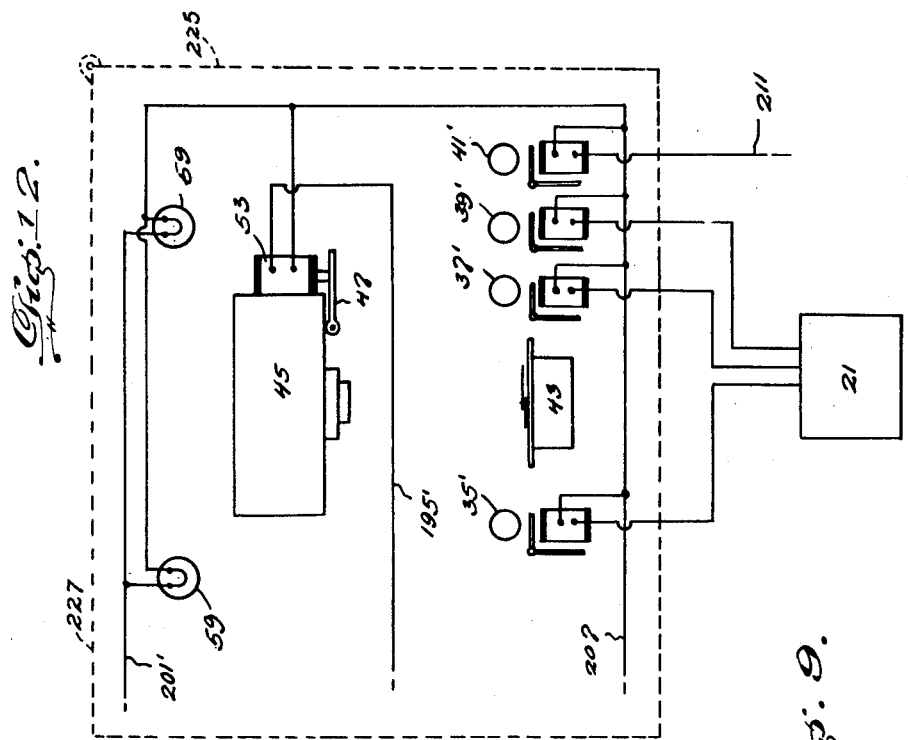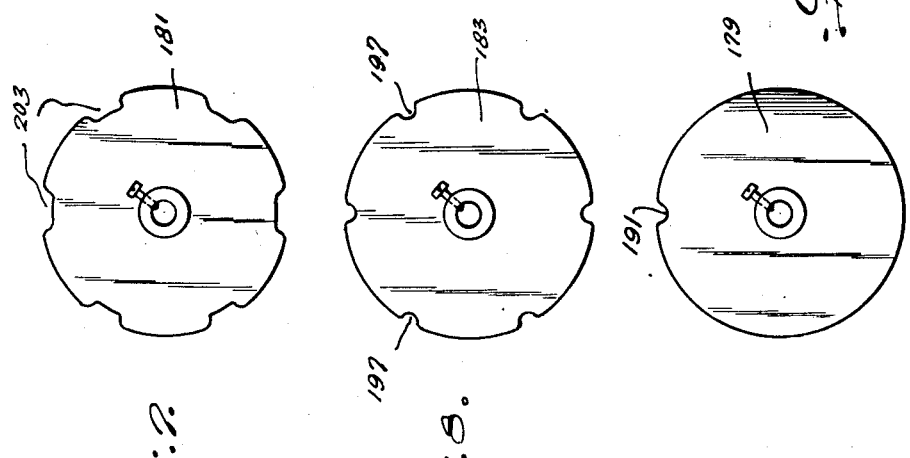

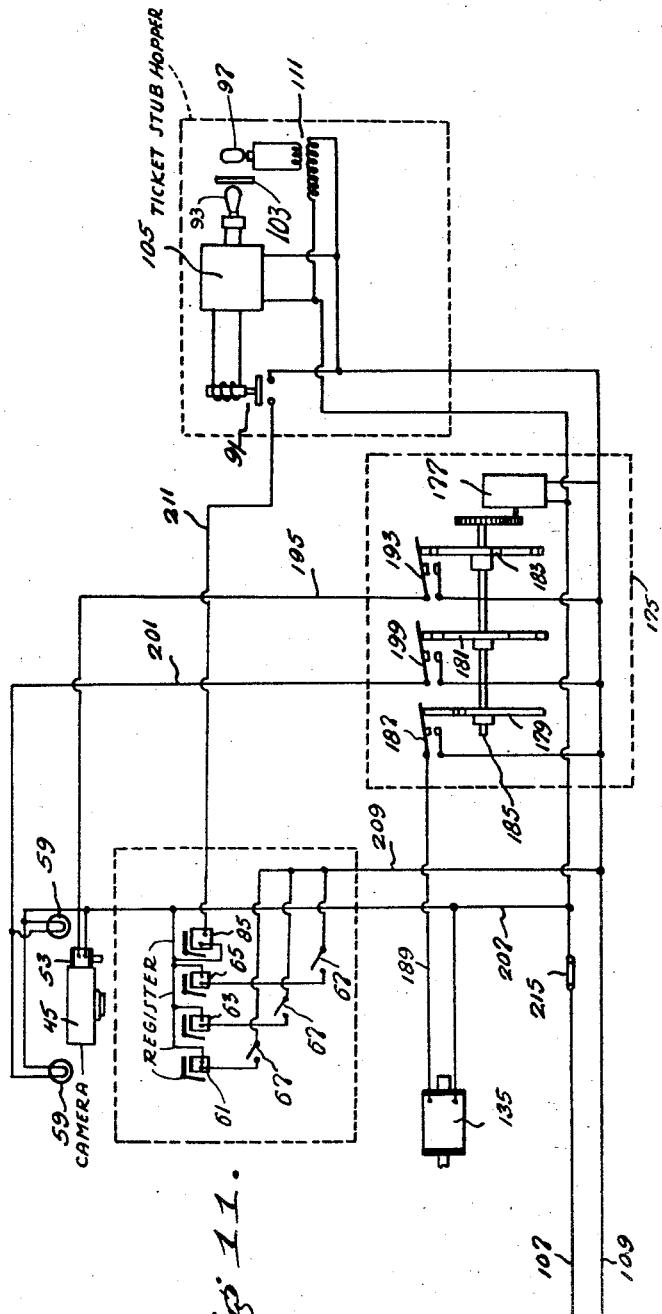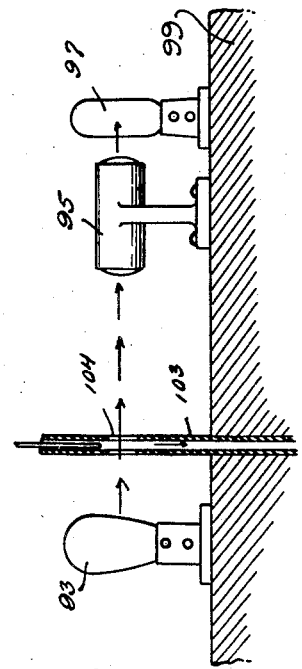
Inventors
Trueman T. Rembusch,
Harris P. Wolfberg,

Patented Feb. 6, 1951

2,540,911

UNITED STATES PATENT OFFICE 2,540,911

COUNTING AND RECORDING APPARATUS

Trueman T. Rembusch, Colorado Springs, Colo.,
and Harris P. Wolfberg, St. Louis, Mo.

Application August 30, 1944, Serial No. 551,876

12 Claims. (Cl. 346—14)

1

The invention relates to systems and apparatus for counting and recording the number of tickets issued and ticket stubs deposited in theaters or other places of amusement or recreation.

An object of the invention is the provision of an improved counting and recording system for automatically counting and recording the total number of tickets issued and ticket stubs deposited in theaters and other places of amusement or recreation, in order to provide a comprehensive record of the ticket sales and to check the honesty of the employees charged with the duty of selling and collecting tickets.

Another object of the invention is the provision of an improved system and apparatus for automatically counting and making periodic photographic records of the number of tickets issued and ticket stubs deposited.

Another object of the invention is the provision of an improved ticket counting and recording apparatus comprising a camera and photo-flood illuminating means controlled by a timing mechanism for automatically taking photograph records at periodic intervals of ticket totaling registers and a time clock.

Another object of the invention is the provision of an improved ticket counting and recording system comprising totalizing means for registering the number of tickets issued and ticket stubs deposited, a time clock, and a camera and illuminating means controlled by a timing device for periodically taking photographs of the ticket issue registers and the ticket stub registers and said clock.

Another object of the invention is the provision of improved ticket registering and recording apparatus wherein the total number of tickets issued by a ticket machine are registered at a remote location and a photographic record as periodically made of the remote ticket register device.

Another object of the invention is the provision of an improved ticket stub collecting device comprising a rotatable ticket-stub hopper having a plurality of removable hopper sections and means for periodically actuating the hopper to successively move the hopper sections beneath a ticket stub deposit slot.

Another object of the invention is the provision of an improved electromagnetic actuating mechanism for actuating the rotatable ticket stub hopper.

Another object of the invention is the provision of an improved ticket stub collecting and count-

2 ing device comprising a ticket stub collecting hopper and a photoelectric cell and exciter lamp interposed between the ticket stub deposit slot and the hopper for controlling an electric relay arranged to operate a ticket stub totalizing register at a remote location.

The novel features that are considered characteristic of the invention are set forth in particular in the appended claims. The invention itself, however, both as to structure and mode of operation, together with other objects and advantages thereof, will be understood from the following detailed description of several embodiments thereof when read in conjunction with the accompanying drawings, in which:

Fig. 3 is a vertical sectional view of the ticket stub collecting and counting device, which is located at a point remote from the ticket booth.

Fig. 4 is a plan view of the ticket stub collecting and counting device with parts broken away to show the photoelectric cell unit and portions of the sectional hopper.

Fig. 5 is a detail plan view, partly in section, showing the actuating mechanism of the multiple-section hopper.

Fig. 6 is a plan view, partly in section, of the mounting discs of the electromagnetic actuating means shown in Fig. 5.

Fig. 6a is a plan view of lower mounting discs.

Fig. 7 is a front elevational view of the timing disc which controls the photo-flood lamps.

Fig. 8 is a front elevational view of the timing disc which controls the operation of the camera.

Fig. 9 is a front elevational view of the timing disc which controls the hopper actuating electromagnet.

Fig. 10 is an enlarged detail view of the photoelectric cell and exciter unit.

Fig. 11 is a schematic view of the ticket counting and recording apparatus including a wiring diagram of the electrical circuits.

Fig. 12 is a schematic view of a modification of the invention, wherein the registering and recording apparatus are mounted in a cabinet at a location remote from the ticket machine and ticket booth; and Figure 13 is a fragmentary elevational view of a portion of the ticket ejecting machine with parts broken away to show a sprocket of one of the ticket ejecting mechanisms and the switch actuated thereby for operating a ticket register.

As briefly mentioned above, the purpose of the invention is the provision of improved counting and recording apparatus for automatically counting and recording the total number of tickets issued and ticket stubs deposited in a theater or other place of amusement or recreation, in order to provide a means whereby the owner or manager may check the honesty of employees charged with the sale and collection of tickets and also to provide a comprehensive record of the ticket sales and attendance at any given time or periods of time.

Briefly, the invention comprises the provision of one or more ticket totalizing registers, a ticket stub register controlled by a photoelectric cell unit and relay for indicating the total number of ticket stubs deposited, a time clock adjacent the registers, photographic apparatus comprising a camera having means for taking a plurality of photographic records of the registers and clock, and electrical means including a timing mechanism having electrical switch means for periodically energizing the operating electromagnet of the camera and photo-flood illuminating lamps. Further, in accordance with the invention, the ticket stub collecting device is provided with a rotatable hopper having a plurality of removably mounted hopper sections adapted to be moved successively at timed intervals beneath the ticket stub slot by means of an improved electromagnetic actuating means which is controlled by an additional switch means associated with the above mentioned timing mechanism.

Figure 1:
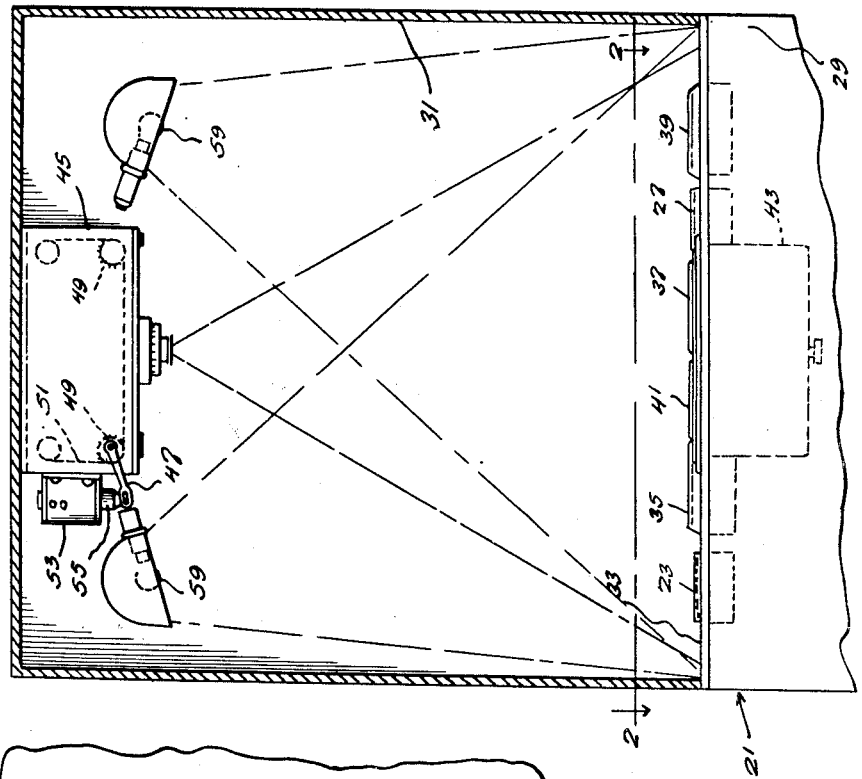
Fig. 1 is a fragmentary horizontal sectional view of the upper portion of a ticket machine equipped with ticket-totalizing registers, a time clock and photographic recording apparatus in accordance with the invention.
Figure 2:
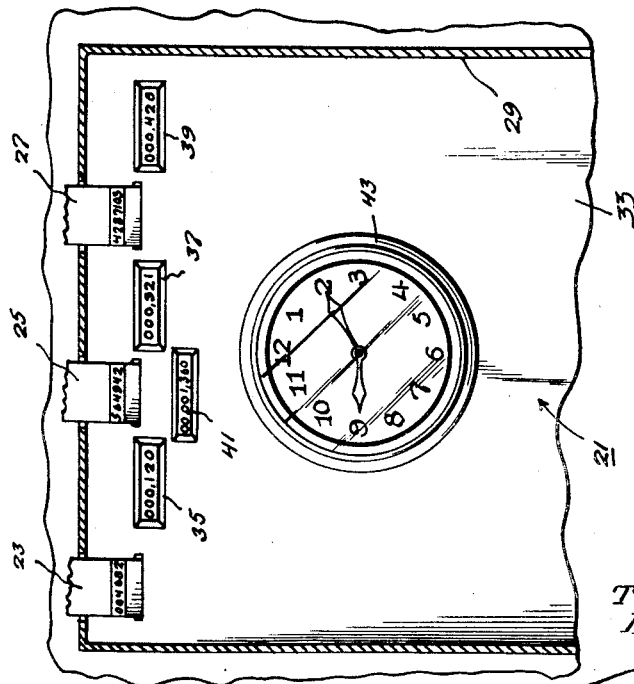
Fig. 2 is a fragmentary vertical sectional view taken substantially along the line 2—2 of Fig. 1, showing the ticket registers, the ticket stub register, portions of the tickets, and the time clock as viewed thru the lens of the camera.

Referring to Figures 1 and 2 of the drawing, the reference numeral 21 generally designates a ticket issuing machine containing a mechanism (not shown) of any standard construction for automatically ejecting tickets 23, 25 and 27 of various denominations in response to operation of manual push buttons (not shown). A part of the housing of the machine is shown at 29. Mounted on a vertical wall 33 in a closed compartment beneath the top of the ticket machine housing are a plurality of totalizing registers 35, 37 and 39 of conventional construction for visibly indicating the total number of tickets of each denomination issued by the ticket machine. Another totalizing register 41 is mounted on the wall 33 in proximity to the other registers, and this register serves to visibly indicate the total number of ticket stubs which are deposited in a ticket receiving device hereinafter described. The registers 35—41 are preferably of standard type in which the totalizing dials thereof are actuated by means of an electromagnet, and, since registers of this type are well known, the details thereof need not be shown and described herein. Mounted on the wall 33 adjacent the aforementioned registers is a conventional time clock 43 which may be either of the electric or mechanical type.

Mounted on the wall of the compartment opposite the wall 33 and facing the registers is a camera 45. The camera 45 may be of any suitable construction, but is preferably of a standard 8 or 16 millimeter type having conventional film receiving and advancing mechanism, a shutter mechanism and a wide angle adjustable lens. The camera is provided with an operating lever 47 arranged to operate the camera shutter mechanism during the initial part of the movement of the lever and to thereafter operate the film sprockets 49 to advance the film 51 one frame during the remaining portion of the throw of the lever. An electric solenoid 53 mounted at the side of the camera has its movable coil 55 connected to the free end of the operating lever for effecting operation of the camera each time the solenoid winding is energized. A biasing spring (not shown) returns the operating lever and solenoid core to normal position upon deenergization of the solenoid. The connections between the operating lever 47 and the sprockets 49, and also between the operating lever 47 and the camera shutter mechanism, may be of any well known type such that the operating lever actuates the sprocket and the shutter mechanism only during its movement in one direction and not during the return or retrieving movement.

One or more illuminating lamps 59 of the photo-flood type are mounted at the side of the camera 45 so as to project the necessary amount of light on the registers and clock at times when the camera is being operated to photograph these elements.

The camera and photo-flood lamps are controlled by means hereinafter described so as to take a plurality of photographs of the registers and clock at predetermined intervals of time.

The operating electro-magnets of the ticket totalizing registers 35, 37 and 39 are shown schematically at 61, 63 and 65, respectively, in diagrammatic Figure 11. Each ticket register electromagnet is controlled by a separate switch 67 associated with a part of the corresponding one of the ticket ejecting mechanisms of the ticket machine. Referring to Fig. 13, which shows part of one of the ticket ejecting mechanisms, one of the switches 67 is shown associated with the ticket ejecting sprocket 69. The switch is mounted on an insulating base 71 and comprises a stationary contact 73, and a cooperating movable contact 75 mounted on the intermediate portion of a leaf spring arm 77 which is pivotally mounted at one end on the base 71 by means of a pivot pin 79. The contact arm 77 is biased to a contact open position by a spring 81 connected to the arm and anchored to the base. In its normal open position the contact arm rests against a stop 83. The free end of the contact arm 77 has an insulating block 78 secured thereto, the end of which is disposed in the path of movement of the arms of the sprocket 69. Each time the sprocket moves during a ticket ejecting operation one of the sprocket arms wipes by the end of the contact arm 77, thereby momentarily closing the contacts 73 and 75 of the switch 67. Closure of the switch 67 completes a circuit for energizing the corresponding ticket register electromagnet to effect a single actuation of the ticket register.

The actuating electromagnet of the ticket stub register 41 is shown schematically at 85, and this electromagnet is adapted to be energized to effect operation of the register 41 each time a ticket stub is deposited in the ticket stub receiving device.

The ticket stub receiving device is shown in Figs. 3 and 4 and comprises a housing 87, in the top 101 of which is provided a slot 89 for receiving ticket stubs deposited in the receiver by an attendant.

In order to effect operation of the ticket stub register electromagnet 85 each time a ticket stub is deposited in the receiver, the circuit of the electromagnet 65 for the register 41 is arranged to be controlled by an electric relay 91 (Fig. 11) which is in turn controlled by a photoelectric cell 93 on which a beam of light is projected thru a condenser lens unit 95 by an exciter lamp 97.

The photoelectric cell 93, condenser lens unit 95 and exciter lamp 97 are mounted on the upper end plate 99 of the receiver housing beneath the dome-shaped top 101, with the photoelectric cell and the exciter lamp and lens arranged on opposite sides of a tube 103 thru which the ticket stubs fall into the hopper within the receiver. The tube 103 is provided with a small opening 104 (Fig. 10) thru which the light beam is projected on the photoelectric cell.

The photoelectric cell 93 is electrically coupled thru a standard amplifier unit 105 to the coil of the relay 91 as shown diagrammatically in Fig. 11. The line terminals of the amplifier are connected to the 110 volt alternating current supply lines 107—109. The low voltage exciter lamp 97 is preferably energized from the above mentioned supply lines thru a voltage reducing transformer 111. The amplifier unit 105 may be mounted in the lower portion of the receiver housing 87, as shown in Fig. 3.

As long as the light beam from the exciter lamp falls on the photoelectric cell, the relay 91 remains energized and holds its contacts open. Each time a ticket stub falls thru the tube 103, the light beam is intercepted by the passage of the ticket stub across the opening 104, whereupon the flow of current to the relay coil is momentarily interupted, thereby causing the relay 91 to be momentarily deenergized and close its contacts to complete the energizing circuit for the electromagnet 85 of the ticket stub register 41. In this manner the ticket stub register is operated each time a ticket stub is deposited in the receiver, so that the register visibly indicates at all times the total number of ticket stubs that have been deposited.

The ticket stub receiver 87 (Figs. 3 and 4) has a plural section hopper 115 rotatably mounted therein for receiving the ticket stubs. The hopper comprises a cylindrical rack consisting of a tube 117 having a cylindrical pan 119 secured to the lower end thereof and a plurality of radially extending partitions 121 which form compartments for receiving removable hopper sections. The tube 117 and pan 119 are rigidly secured to a central shaft 123 which is rotatably mounted at its upper and lower ends in bearings 125 and 127. Removably mounted in the compartments on the rack are a plurality of segment-shaped hopper sections or containers 129. The hopper sections or containers 129 are closed at their lower ends and open at the top, and these sections are retained in mounted position on the pan 119 by the peripheral flange of the pan. A resilient ring or wire clamp 131 is slipped over and around the upper ends of the hopper sections 129 to hold them in mounted position.

The casing 87 of the receiver is provided with a hinged door 133 so as to permit removal of any of the hopper sections.

The rotatable hopper 115 is adapted to be partly rotated by steps at timed intervals to successively position the hopper sections beneath the ticket stub slot and tube so that the ticket stubs are collected for one interval of time in one of the hopper sections 129 and during the following intervals of time they are collected successively in the other hopper sections. At the end of the day the hopper sections are removed and their contents emptied and sacked separately for examination along with the photographic records of the registers. Any large difference between the proper sequence of numbers printed on the ticket stubs and those shown on the photographic record of the registers, which are the same numbers as the ticket stubs, will show definitely that there has been dishonesty on the part of the employees charged with the sale and collection of tickets.

Step by step periodic rotation of the hopper 115 is effected by an electromagnetic actuating device indicated generally at 135 (Figures 3 and 5). Rigidly secured on the lower end of the shaft 123 is a ratchet disc 137 the teeth of which are adapted to be engaged by a spring biased retaining means comprising a roller 139 carried by a rod 141 which is slidably supported in a tubular support 143 which is mounted on the plate 145 in the housing. The plate 145 forms the mounting support for the shaft 123 and hopper 115. A spring 147 biases the rod and roller 139 into engagement with the teeth of the ratchet so as to hold the hopper against rotation during the intervals when the electromagnet is deenergized. The roller also functions to limit movement of the ratchet to one step at a time and to eliminate any back movement and any over travel of the ratchet and hopper.

The electromagnetic actuating means 135 for periodically imparting step by step rotation of the ratchet 137 and hopper 115 comprises a solenoid having a stationary laminated magnetic core structure 151 and a cooperating movable plunger 153 of magnetic material slidably mounted centrally within the core structure. An energizing winding 155 is disposed within the open frame core structure and surrounds the plunger. Attached to one end of the plunger are a pair of spaced extending arms 157 (Figures 3 and 5) the free ends of which carry a cross pin 159 adapted to engage the teeth of the ratchet 137.

The entire solenoid assembly is mounted for limited pivotal movement on a circular base plate 161 (Figs. 5 and 6) so that the solenoid assembly may pivot a limited amount as the plunger is moved axially to advance the ratchet 137 and hopper 115. This is necessary because the cross pin 159 must move in an arcuate path as the ratchet is moved by the solenoid. Referring to Fig. 6, the mounting plate 161 has a pair of studs 163 projecting upwardly therefrom on opposite sides of the center of the plate. A cylindrical plate 165 is rotatably mounted on the base plate 161 by means of pivot screw 167 which screws into a central opening in the base plate. The rotatable plate 165 has a pair of arcuate slots therein thru which the stop studs 163 extend to limit rotation of the plate. The plate 165 is also provided with a pair of short projecting studs 169. A pair of helical tension springs 171 connect the studs 169 to the studs 163 so as to bias the rotatable plate and solenoid assembly to the normal inactive position shown in Figs. 5 and 6. The solenoid assembly comprising the core structure is mounted on the rotatable plate 165 by means of a plurality of screws 173.

When the solenoid is energized the plunger is projected thereby and the cross pin 159 advances the ratchet wheel 137 one step, thereby advancing the hopper 115 to present a new hopper section 129 beneath the ticket slot. During this movement the solenoid assembly pivots slightly on the pivot screw 167. When the solenoid is deenergized a spring (not shown) retrieves the plunger. During retrieving the cross pin 159 slides over the teeth of the ratchet and the solenoid assembly pivots to permit this movement.

The solenoid is adapted to be momentarily energized at predetermined intervals of time, for example, every half hour, by the switch 187 operated by the disc 179, in order to advance the hopper 115.

Referring now to Fig. 11, energization of the photo-flood lamps 59, the camera electromagnet 53 and the hopper actuating solenoid 135 is controlled automatically by a timing mechanism shown schematically at 175 comprising a clock motor 177 which drives three switch actuating timing discs 179, 181 and 183. The clock motor is preferably an electrically operated motor which is energized from the 60 cycle A. C. supply lines 107—109, and this thru suitable reduction gears drives a shaft 185 on which the timing discs are adjustably mounted.

The timing disc 179 controls a switch 187 which is connected in series in the energizing circuit 189 of the hopper actuating solenoid 135. The shaft 185 is driven at a predetermined speed by the clock motor, for example, at a speed such that each of the timing discs makes one complete revolution every thirty minutes. As shown in Fig. 9, the disc 179 has a single notch 191 formed in its periphery, and the extending spring arm of the switch 187 (Figure 11) engages the edge of the disc and is arranged so that the contacts are normally held open by the disc except when the spring arm drops down into the notch. When this occurs the contacts of the switch 187 close and effect energization of the hopper solenoid 135. Thus every half hour the solenoid 135 is energized momentarily to cause a single advance movement of the rotatable hopper 115.

The timing disc 183 cooperates with a switch 193 which is connected in series in the energizing circuit 195 of the electromagnet 53 which effects operation of the camera 45. The extending spring arm of the switch 193 engages the peripheral edge of the disc 183 and is normally held open by the disc. As shown in Fig. 8, the disc 183 is provided with a series of spaced notches 197 in the peripheral edge so as to permit closing of the switch each time the spring arm drops into any of the notches. This causes the electromagnet 53 to be periodically energized to effect operation of the camera at predetermined time intervals. The notches 197 are preferably such that the switch 193 is closed to effect operation of the camera at relatively short intervals of time, for example, every five minutes, altho the intervals could, of course, be longer or shorter, as desired.

The disc 181 (Fig. 7) has associated therewith a switch 199 which is electrically connected in series in the energizing circuit 201 of the photo-flood lamps 59. The extending spring arm of this switch engages the peripheral edge of the disc and the switch is normally held open except when the switch arm drops into any of the series of notches 203 formed in the edge of the disc, whereupon the switch closes momentarily to cause illumination of the photo-flood lamps. The disc 181 has the same number of notches as the camera controlling disc 183 and are substantially located in the same position as the notches of the camera disc so that the photo-flood lamps will be illuminated during each time the camera shutter is operated. The notches 203, however, are somewhat longer than the notches in the camera disc so that the flood-lamps will be on a short time before and after the camera shutter is operated.

The circuit 195 for the camera electromagnet 53 is connected thru the switch 193 to the supply line 109 and the other terminal of this electromagnet is connected thru a common return conductor 207 to the other supply conductor 107. Similarly, the circuit conductor 201 for the flood-lamps 59 is connected thru the switch 199 to conductor 109, the other terminals of the lamps being connected to the line 107 thru the conductor 207. One terminal of the hopper solenoid is connected to the line 107 and its other terminal is connected thru conductor 189 and switch 187 to the supply line 109.

Each of the ticket register electromagnets 61, 63 and 65 has one terminal connected to the supply conductor 107 by conductor 207. The other terminal of each of these electromagnets is connected thru a corresponding one of the ticket ejecting mechanism switches 67 and conductor 209 to the supply line 109.

A circuit 211 for energizing the ticket stub register electromagnet 85 extends thru the normally open contacts of the relay 91 to the supply line 109, the other terminal of the electromagnet being connected thru the conductor 207 to the supply line 107.

The operation of the apparatus is briefly as follows: Assuming that the main control switch 215 is closed, the photoelectric cell 93 and exciter lamp 97 will be energized and the clock motor 177 operated to drive the timing discs 179, 181 and 183. Each time a ticket 23, 25 or 27 is ejected by the ticket machine (Figures 1 and 2), the corresponding switch 67 will close momentarily and effect operation of the corresponding ticket register electromagnet 61, 63 or 65 and hence the ticket register 35, 37 or 39. Each time a ticket stub is deposited in the receiver 87 (Figures 3 and 4), the light beam projected on the photoelectric cell 93 is interrupted, thereby causing the relay 91 to momentarily close its contacts and effect an operation of the ticket stub register electromagnet 85 and actuation of the ticket stub register 41.

Every five minutes the timing discs 181 and 183 will cause momentary closure of the switches 199 and 193, thereby causing the photo-flood lamps 59 and the camera operating electromagnet 53 to be energized so that a photographic record is taken of the time clock 43 and the ticket registers 35, 37, 39 and ticket stub register 41.

Every thirty minutes the timing disc 179 causes momentary closure of the switch 187 to effect momentary energization of the hopper actuating solenoid 135, thereby causing a new hopper section 129 to be moved under the ticket stub slot.

At the end of the day the film records are removed and the hopper sections removed and the contents thereof sacked separately for comparison and checking.

Any large discrepancies between the numbers printed on the tickets in the various hopper sections when compared with the photographic records of the registers will indicate that there may have been dishonesty on the part of the employees charged with the sale and collection of tickets. The records also provide a comprehensive record of the sales attendance at any given time or for any given periods of time.

In accordance with a modification of the invention, the ticket registers, ticket stub register, clock, camera and photo-flood lamps may be mounted in a cabinet at a location remote from the ticket machine and booth, for example, in the manager's office, as shown schematically in Fig. 12. The above mentioned elements in this modification are identified by the same reference characters with a prime mark added as the corresponding elements shown in the original embodiment. The cabinet for housing the registers, clock, lamps and camera is indicated by the reference numeral 225. The cabinet has a hinged door 227 to provide access to the elements. The structure, mode of operation and electrical connections for the elements in this modification are identical to those of the original embodiment.

While the invention has been disclosed in accordance with the provisions of the patent statutes, it is to be understood that various changes may be made in the structural details thereof and in the combinations and arrangement of elements without departing from some of the essential features of the invention. It is desired, therefore, that the appended claims be given as reasonably broad interpretation as their language will permit.

What is claimed is:

1. In combination with a ticket issuing machine, an enclosure forming a closed concealing compartment registering means including a register indicator in said compartment for automatically visibly registering the total number of tickets of particular denomination issued by said machine, a photographic camera confronting said register indicator having means for taking a plurality of photographs of said register indicator, illuminating means confronting said register indicator for illuminating said register indicator, and means including a timing mechanism for automatically effecting energization of said illuminating means and synchronous operation of said camera at predetermined intervals of time.

2. A ticket counting and recording system for counting and recording the total number of tickets of a given denomination issued by a ticket machine comprising an enclosure forming a closed concealing compartment registering means including a register indicator in said compartment for automatically visibly registering the total number of tickets of given denomination issued by the ticket machine, a photographic camera confronting said register indicator having means for taking a plurality of photographs of said register indicator, an electromagnet for operating said camera, illuminating means confronting said register indicator for illuminating said register indicator, and electro mechanical means including a timing mechanism having switch means for automatically effecting synchronous energization of said illuminating means and said electromagnet at predetermined intervals of time.

3. A ticket counting and recording system for counting and recording the total number of tickets issued by a ticket machine comprising, in combination, an enclosure forming a closed concealing compartment, registering means including a register indicator in said compartment for automatically registering the total number of tickets of given denomination issued by said machine, a clock disposed adjacent said register indicator in said compartment, photographic apparatus comprising a camera confronting said register indicator and clock having indicator for taking a plurality of photographs of said register indicator and said clock, an electromagnet for operating said camera, illuminating means confronting said register indicator and clock for illuminating said register indicator and said clock, and electro mechanical means including a timing device having switch means for automatically synchronously energizing said illuminating means and said electromagnet at predetermined intervals of time.

4. A ticket counting and recording system for counting and recording the total number of tickets of given denomination issued by a ticket issuing machine comprising an enclosure forming a closed concealing compartment adjacent said ticket machine, registering means including a register indicator in said compartment for automatically visibly registering the total number of tickets of given denomination issued by said machine, a clock adjacent said register indicator in said compartment, a photographic camera confronting said indicator and clock having means for taking a plurality of photographs of said register indicator and said clock, an electromagnet for operating said camera to take a single photograph and advance the film for the next photograph, illuminating means confronting said indicator and clock for illuminating said indicator and said clock, and means including a timing device having electrical switch means for automatically synchronously energizing said illuminating means and said electromagnet at predetermined time intervals.

5. A ticket counting and recording system for counting and recording the total number of tickets issued by a ticket machine, comprising an enclosure forming a closed concealing compartment remote from said machine, electromagnetically actuated registering means including a register indicator in said compartment for automatically visibly registering the total number of tickets of given denomination issued by said machine, electrical means for operating said registering means including switch means operated in response to ticket issuing operation of said machine for effecting operation of said remote registering means, a clock adjacent said register indicator in said compartment, a photographic camera confronting said clock and indicator having means for taking a plurality of photographs of said indicator and said clock, an electromagnet for operating said camera, illuminating means confronting said clock and indicator for illuminating said indicator and clock, and means including a timing mechanism having electrical switch means for automatically effecting synchronous energization of said camera electromagnet and said illuminating means at predetermined intervals of time.

6. Ticket counting and recording apparatus for counting and recording the total number of tickets issued by a ticket machine and the total number of ticket stubs deposited in a ticket stub collecting device comprising, in combination, an enclosure forming a closed concealing compartment, registering means including a ticket register in said compartment for automatically visibly registering the total number of tickets issued by the ticket machine, registering means including a ticket-stub register indicator in said compartment for automatically counting and visibly registering the total number of ticket stubs deposited in the ticket stub collecting device, a time clock adjacent said indicators in said compartment, a camera confronting said register indicators having means for taking a plurality of photographs of said indicators and said time clock, an electromagnet for operating said camera, illuminating means confronting said indicators and clock for illuminating said indicators and said clock during photographing thereof, and means including a timing mechanism having switch means associated therewith automatically operable to effect periodic synchronous energization of said camera electromagnet and said illuminating means at predetermined time intervals.

7. Ticket counting and recording apparatus for counting and recording the total number of tickets issued by a ticket machine and the total number of ticket stubs deposited in a ticket collecting device comprising, in combination, an enclosure forming a closed concealing compartment a ticket register in said compartment for visibly indicating the total number of tickets of given denomination issued by the ticket machine, means for operating said ticket register in response to each ticket issuing operation of the ticket machine, a ticket stub register in said compartment for visibly indicating the total number of ticket stubs deposited in the ticket collecting device, means including a photoelectric cell unit and relay operated in response to the passage of a ticket stub into said ticket collecting device for operating said ticket stub register, a clock adjacent said registers in said compartment, a camera confronting said registers and clock having means for taking a plurality of photographs of said registers and clock, an electromagnet for operating said camera, illuminating means confronting said registers and clock for illuminating said registers and said clock during photographing thereof, and means including a timing mechanism having electrical switch means automatically operable to periodically effect synchronous energization of said illuminating means and camera electromagnet at predetermined time intervals.

8. Ticket counting and recording apparatus comprising, in combination, a ticket stub collecting device having a slot for receiving ticket stubs, a ticket stub register for visibly indicating the total number of ticket stubs deposited in said device disposed at a location remote from said device, an electromagnet for operating said register, electrical means including a photoelectric cell and exciter lamp disposed beneath said slot for counting ticket stubs deposited, an amplifier and relay operated in response to counting operation of said photoelectric cell for controlling operation of said register electromagnet a camera confronting the ticket stub register, illuminating means confronting the register, and timing means cooperative with the camera and illuminating means to effect periodic synchronized operation thereof at predetermined time intervals to photograph the register.

9. In a ticket counting and recording system, a ticket stub receiving device comprising a casing having a slot therein, a plural section rotatable hopper in said casing having a plurality of removable hopper sections movable successively beneath said slot, mechanism comprising an electromagnet operable when energized to move said hopper one step to position another hopper section beneath said slot, a ticket stub register for visibly indicating the total number of ticket stubs deposited in said receiver disposed at a location remote from said receiver, an electromagnet for operating said register, electrical means including a relay for controlling operation of said register electromagnet and a photoelectric cell and exciter lamp disposed between said slot and hopper for counting the ticket stubs deposited and controlling operation of said relay, photographic apparatus including a camera having means for taking a plurality of photographic records of said register, an electromagnet for operating said camera, and means including a timing mechanism having electrical switch means automatically operable at predetermined time intervals for effecting energization of said camera electromagnet and said hopper electromagnet.

10. In a ticket counting and recording system, a ticket stub receiving device comprising a casing having a slot therein, a plural section rotatable hopper in said casing having a plurality of removable hopper sections movable successively beneath said slot, mechanism comprising an electromagnet operable when energized to move said hopper one step to position another hopper section beneath said slot, a ticket stub register for visibly indicating the total number of ticket stubs deposited in said receiver disposed at a location remote from said receiver, an electromagnet for operating said register, electrical means including a relay for controlling operation of said register electromagnet and a photoelectric cell and exciter lamp disposed between said slot and hopper for counting the ticket stubs deposited and controlling operation of said relay, photographic apparatus including a camera having means for taking a plurality of photographic records of said register, an electromagnet for operating said camera, and means including a timing mechanism having electrical switch means automatically operable to energize said camera electromagnet at predetermined time intervals and having a second electrical switch means automatically operable at predetermined time intervals of longer intervals to effect energization of said hopper electromagnet.

11. In a ticket counting and recording system, a ticket stub receiving device comprising a casing having a slot therein, a plural section rotatable hopper in said casing having a plurality of removable hopper sections movable successively beneath said slot, mechanism comprising an electromagnet operable when energized to move said hopper one step to position another hopper section beneath said slot, a ticket stub register for visibly indicating the total number of ticket stubs deposited in said receiver disposed at a location remote from said receiver, an electromagnet for operating said register, a time clock adjacent said register, electrical means including a relay for controlling operation of said register electromagnet and a photoelectric cell and exciter lamp disposed between said slot and hopper for counting the ticket stubs deposited and controlling operation of said relay, photographic apparatus including a camera having means for taking a plurality of photographic records of said register and said time clock, an electromagnet for operating said camera, and means including a timing mechanism having electrical switch means automatically operable at predetermined time intervals for effecting energization of said camera electromagnet and said hopper electromagnet.

12. A ticket counting and recording system for counting and recording the total number of tickets issued by a ticket machine, comprising an enclosure forming a closed concealing compartment, registering means for automatically registering the total number of tickets of a particular denomination issued by said machine including a total register indicator in said compartment, a photographic camera confronting said register indicator having means for taking a plurality of photographs of said register indicator, an electromagnet for operating said camera, an electric illuminating lamp confronting said register indicator, means including electrical circuits and motor driven switch means for automatically effecting simultaneous energization of said electric lamp and said electromagnet at predetermined intervals of time.

TRUEMAN T. REMBUSCH.
HARRIS P. WOLFBERG.

REFERENCES CITED

The following references are of record in the file of this patent:

UNITED STATES PATENTS

| Number | Name | Date |
| --- | --- | --- |
| 486,399 | Garnett et al. | Nov. 15, 1892 |
| 1,094,073 | Ilg | Apr. 21, 1914 |
| 2,091,768 | Noble | Aug. 31, 1937 |
| 2,278,357 | Madden | Mar. 31, 1942 |
| 2,336,081 | Finnegan et al. | Dec. 7, 1943 |
| 2,369,717 | Compton | Feb. 20, 1945 |